(12) United States Patent
Tsao

(10) Patent No.: US 9,201,961 B2
(45) Date of Patent: *Dec. 1, 2015

(54) CONCURRENT WEB BASED MULTI-TASK SUPPORT FOR COMPUTER SYSTEM

(71) Applicant: Sheng Tai (Ted) Tsao, Fremont, CA (US)

(72) Inventor: Sheng Tai (Ted) Tsao, Fremont, CA (US)

(73) Assignee: Sheng Tai (Ted) Tsao, Fremont, CA (US)

( * ) Notice: Subject to any disclaimer, the term of this patent is extended or adjusted under 35 U.S.C. 154(b) by 437 days.

This patent is subject to a terminal disclaimer.

(21) Appl. No.: 13/625,121

(22) Filed: Sep. 24, 2012

(65) Prior Publication Data

US 2014/0089380 A1  Mar. 27, 2014

Related U.S. Application Data

(60) Continuation of application No. 12/079,521, filed on Mar. 27, 2008, now Pat. No. 9,015,321, which is a division of application No. 10/713,904, filed on Aug. 6, 2002, now Pat. No. 7,418,702.

(51) Int. Cl.
*G06F 15/16* (2006.01)
*G06F 17/30* (2006.01)

(52) U.S. Cl.
CPC .................. *G06F 17/30861* (2013.01)

(58) Field of Classification Search
None
See application file for complete search history.

(56) References Cited

U.S. PATENT DOCUMENTS

| 2003/0084049 A1* | 5/2003 | Wiley ............................. 707/10 |
| 2005/0149564 A1* | 7/2005 | Jain et al. .................... 707/104.1 |
| 2006/0069687 A1* | 3/2006 | Cui et al. ........................ 707/10 |

* cited by examiner

*Primary Examiner* — Mohamed Ibrahim

(57) ABSTRACT

Supporting of web multitasking via a single web browser is important, especially for small sized communication device where a displayed web browser is a precious resource. The supporting of the web multitasking improves efficiency for user to utilize the web browser for daily works, for example, while a person accessing a streaming video in a storage space across world wide web, the person also needs to handle an emergent incoming email. The supporting of the web multitasking is also an important step towards creating a web based computer user work environment for any type of operating system.

20 Claims, 7 Drawing Sheets

Console support in a Simple Environment

Data traveling between web-console and console supporting software a) Data Path 1:
Referred as sending data from web-console (9 of Fig. 2) to console support software (6 of Fig. 2) or referred as console supporting software (6 of Fig. 2) get data from web-console (9 of Fig. 2).

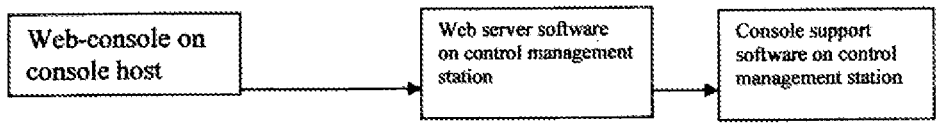

b) Data Path 2: (reverse path)
Referred as sending data from console supporting software (6 of Fig. 2) to web-console (9 of Fig. 2) or referred as web-console (9 of Fig. 2) gets data from console supporting software (6 of Fig. 2)

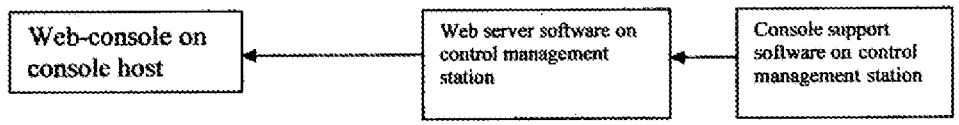

Fig. 3

Basic Task & Operation Processing Flow Chart in a CCDSVM environment.

The abstraction of data structure for multiple simultaneous concurrent tasks and operations support in CCDSVM environment.

The typical hardware components of control management station, system units, and console hosts.

CONCURRENT WEB BASED MULTI-TASK SUPPORT FOR COMPUTER SYSTEM

CROSS-REFERENCES RELATED TO APPLICATION(S)

This application a continuation application of (a) U.S. patent application Ser. No. 12/079,521 filed on Mar. 27, 2008, which in turn is a divisional application of (a) U.S. patent application Ser. No. 10/713,904 filed on Aug. 6, 2002 and is converted from U.S. Provisional Application 60/401,238 and now is a U.S. Pat. No. 7,418,702. All above mentioned applications are herein incorporated by references in their entireties for all purposes.

FIELD OF THE INVENTION

The present invention generally relates to support web based multitasking for a single computing device or a plurality of computing devices of a web based central controlled distributed scalable virtual machine system ("CCDSVM"). with respect to a web based computer user work environment.

BACKGROUND OF THE INVENTION

A typical computer system provides a computer user work environment to end users, wherein the computer user work environment runs on top of a generic computer operating system. With this work environment, an end user can login to the computer system and, setup various computer resource access controls based on his or her permitted role. Therefore, the end user, for example, can configure computer resources such as disks, networks, file folder/directory systems, and others. Also, various computer tasks & operations can be executed by the computer application; and the computer operating system of a computer system provides the results of tasks to the end user. Specially, with a generic computer operating system, this computer user work environment allows a plurality of concurrent users each to run multiple concurrent tasks or operations simultaneously.

The computer user work environment has evolved from paper tape & punch card environment, command line environment on a native system to window & mouse click environment on a native system in the past. This invention provides users a web-based computer user work (operating) environment on top of generic operating system for a single or multiple computers, and allows each of the users to access one or multiple computing devices through a conventional web-browser.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings:

FIG. 3 illustrates an example of basic data flow between a web-console on a console host and the console supporting software in a control management environment.

BRIEF DESCRIPTION OF THIS INVENTION

The traditional web server or other server may support a user from a web browser on a computing device somewhere on the network to perform tasks of accessing the server, that the task could get quick response and could be finished in a short period of time, fore example, checking a web server's status or getting the server's other information, et cetera. However, it may not support well for multiple simultaneous concurrent tasks or operations from the same web-browser, especially when these tasks are time consuming to finish.

Figure 1:
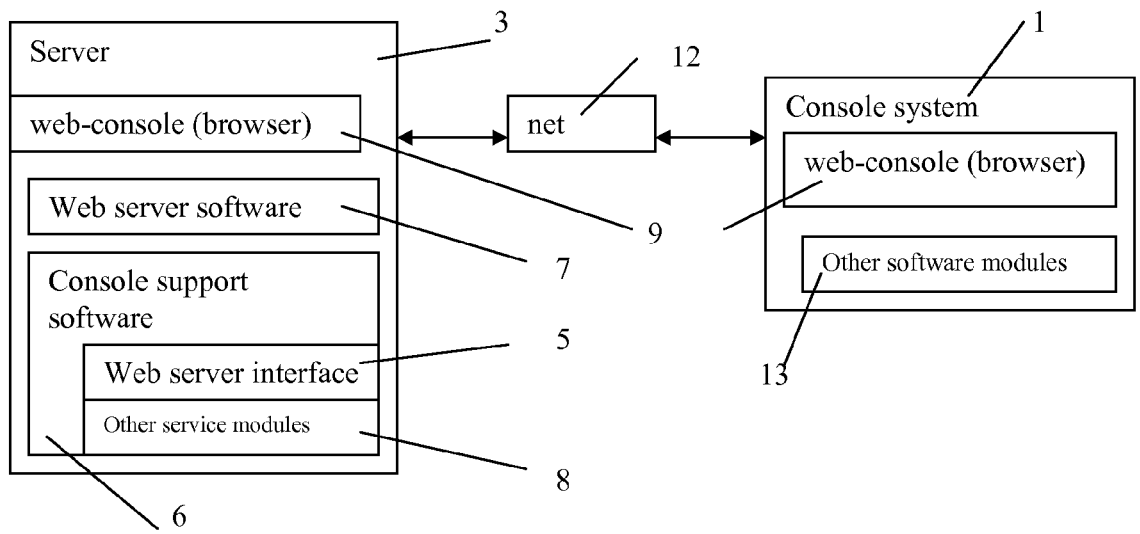
FIG. 1 illustrates an example of a simplified multi-tasks support on Web-console in a simple environment.

For example, creating a 60 GB file system on the server, or configuring a raid controller on that server illustrated in FIG. 1 is such a time task. Because these tasks often take a large amount of time to be finished, and such tasks will experience hanging and blocked in the web-console (web browser) on a console host such as illustrated in FIG. 1, as a result, no other tasks could be performed in parallel from the same web-console at the same time. In addition, traditional console supporting software does not work for a more complicated environment such as the CCDSVM environment illustrated in FIG. 2.

Figure 2:
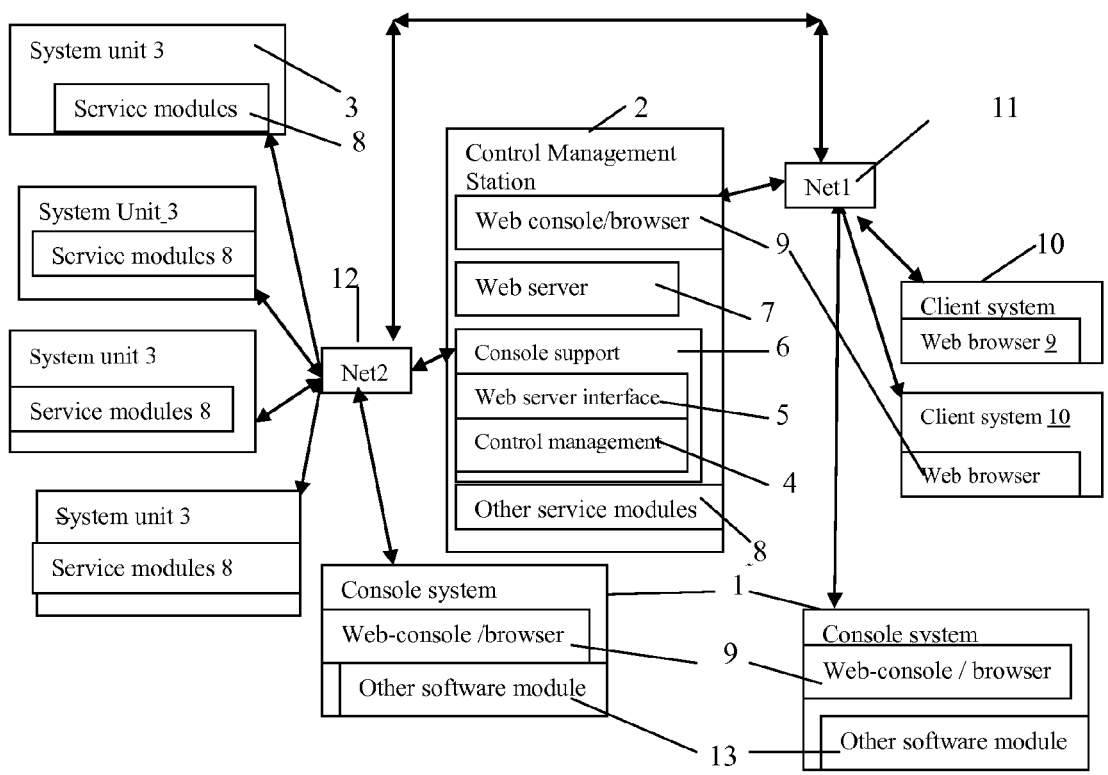
FIG. 2 illustrates an example of a simplified multi-tasks support on Web-console in a CCDSVM environment.

To solve these problems and effectively to support multiple simultaneous concurrent tasks in a web-console for both the simple computing environment as illustrated in FIG. 1 and the CCDSVM environment, the console supporting software illustrated in FIG. 1 needs to include additional control management software modules illustrated in FIG. 2 and others. As illustrated in FIG. 2, the control management software module shall communicate and control all system units 3 and each of the system units 3 needs service software modules to communicate with control management software 4 of console support software 6.

Figure 5:
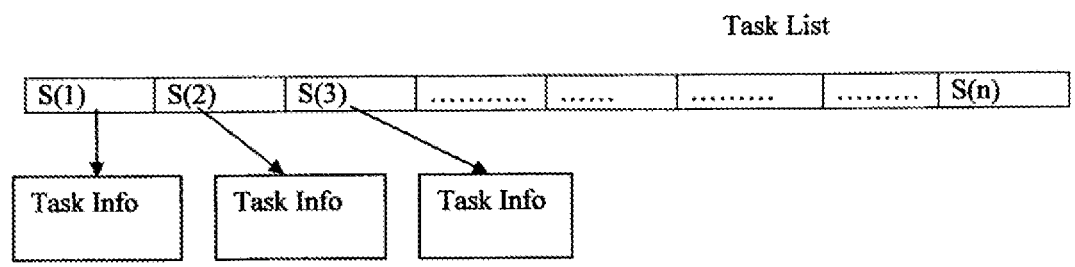
FIG. 5 illustrates a user space task list, which represents an abstraction of data structure for controlling multiple simultaneous concurrent tasks and operations in the CCDSVM environment.

In addition, a user space task list illustrated in FIG. 5 could be used together with conventional or non-conventional locks to support all multiple simultaneous concurrent tasks and operations. With this invention, the multi-tasks support on the web-console in a simple environment shown in FIG. 1 has been viewed as a special case of such support in a CCDSVM environment shown in FIG. 2. The CCDSVM degenerates into the simple server environment if there is no multiple system units 3 that is illustrated in FIG. 2.

These and other features, aspects and advantages of the present invention will become understood with reference to the following description, appended claims and accompanying figures set forth below.

DETAILED DESCRIPTION OF THE INVENTION

The CCDSVM, in one embodiment illustrated in FIG. 2, is typically configured to provide a control management station ("control system") to control a group of computing systems and provide distributed services to at least one client system across Intranet, Internet as well as a LAN environment. The software components of the CCDSVM form a virtual operating environment.

When a server provides software support for allowing a web-browser on a computing system (device) such as a desktop, laptop, server, PDA, or cell phone to access and manage the server, this web-browser is often referred as a web-console. With the CCDSVM, a permitted user from the web-console could be able to access and operate the entire CCDSVM.

To simplify the discussion, the term of thread and process are roughly used without differentiation between them in this invention regardless of the very restricted definition of the thread and process in computer science field. Here both thread and process are basically referred as a sequence of instructions based on a piece of program code that starts to be executed by a computer system step by step to carry out a computer task.

Lock is a mechanism that allows a thread to look a computer resource for its own use and prevents other threads from accessing to the same computer resource at the same time. There is conventional lock which can be acquired and released by the same thread. The conventional lock mechanisms have used by most software developer crossing the software industry. The lock described in this invention may or may not be a conventional one. The non-conventional lock mechanisms created in this invention can be acquired by one thread and may be released by same thread or by another thread. Therefore, it is non-conventional lock serving threads on the computing system.

FIG. 1 illustrates an example of a web-console scheme in a simple computing environment that includes a console host 1, a server 3, and a communication network 12. The console host 1 further includes a web-console 9 (a browser). The server 3 includes a native web-console 9, a web server software 7, and a console support software 6, where the console support software 6 further includes web server interface 5 and other service modules 8. It should be noted that the same reference indicators will be used throughout the drawings and the following description to refer to the same or like items.

The console host 1, from which a user is able to perform system tasks or operations for the server 3 through the web-console (browser) 8. The console host 1 can be any computing system on the network 2 such as a server, a desktop PC, a laptop PC, a hand held PDA, or a cell phone. The web browser 9 may be commercially available software from any vendor or a proprietary software. The web browser 9 is able to handle web protocol such as HTTP. The console host 1 may also include other software modules 13 that may be implemented with any suitable programming languages such as C, C++, Java, XML, et cetera. Other software modules 13 are used to communicate between the server 3 and the console host 1 using IP, non-IP or any suitable protocols for receiving and/or sending data between the console host 1 and the server 3.

The server 3 could be a web server computer or any kind of computing system configured with web server software that includes web server software 7 and console supporting software 5. The console supporting software 6 includes web server interface 5 and other services software modules 8, where the other services software 8 is operated natively on the server 3. The web server software 4 may be a commercially available software or proprietary software, which is able to accept and handle the web protocol such as HTTP. A native web-console (browser) 9 enables a user to access and operate the server computer 3 locally.

Net 2 represents a network infrastructure such as Internet, intranet, and (LAN). The net 2 includes all kind of related network equipment and media such as switches/routers, and different kind of connecting cables and wireless communication media.

FIG. 2 shows an example of a simplified block diagram for an embodiment of the CCDSVM. The CCDSVM system includes console hosts 1, a control management station ("control system") 2, system units 3, networks of net1 11 and net2 12, and client systems 10. The console hosts 1 could be any computing system on the network such as a server, a desktop PC, a laptop PC, a hand held PDA, or a cell phone. A web browser 9 on the console host 1 can be used to access and operate the entire CCDSVM. The web browser 9 may be commercially available software from any vendor or proprietary software company. The web browser 9 is able to handle web protocol such as HTTP. A difference between a web-console 9 and a web browser is that the web-console 9 allows a user accessing system information and performing system operation over computing system such as in the CCDSVM environment.

The console host 1 may also include other software modules 13, which may be implemented with any suitable programming languages such as C, C++, Java, XML etc. These software modules 13 may be used to facilitate communications between the control system 2 and the console hosts 1 using IP, non-IP or any suitable protocols for receiving or sending data between the console host 1 and the control system 2. To support a non-web-based networked console, the software configured for the web console 9 shall be capable of handling protocols other than web protocols such as deploying HTTP for communicating with the console supporting software 6 on the control system.

The control system 2 could be any computing system on the network such as a server, a desktop PC, a laptop PC, or others. The control system 2 includes web server software 7 and console supporting software 6. The console supporting software 6 includes web server interface software modules 5 and control management software modules 4. It should be noted that the console supporting software 6 may includes other native service software modules 8. It may also have a native web browser used as a native web-console 9. The web server software 7 discussed earlier could be commercially available software from a major vendor or other proprietary software that is able to accept and handle the web protocol such as HTTP. The web server software 7 sends data to and receives data from the web-console 9 of the console hosts 1.

The console supporting software 6 can be implemented with any suitable languages such as C, C++, Java, XML, etc. or even implemented by using a combination of different languages as long as it provides the features and functionality described in this invention. That means it is language independent. In addition, the communication protocol used between the console support software 6 and the service software modules 8 of the system units 3 could be any suitable protocol such IP based, or non-IP based or other protocols. The console support software (6) communicates and manages one or more system units 3 and collects resource information on the control system 2 and/or one or more system units 3.

There may be several fixed threads being created based on the control management software modules 4, and each fixed threads may create one or multiple child threads for perform one or more multiple tasks. There are may be various number of threads that are created based on the web server interface software modules 5 for supporting each of tasks submitted by a user via operation menu displayed in the web-console 9. All of these threads may be communicated with each other through inter-process communication and are simply referred as the thread of the console supporting software 6. However, to simplify the discussion, they may be just referred as the console supporting software 6 without mentioning the thread at all.

If there is a need to support a less effective non-web-based networked console, there is no need for the web server software 7 and web server interfacing software module 5 being employed. Instead, an additional network software module is required that could be implemented with any suitable programming language and any suitable communication protocol other than web protocol (HTTP). This network software module can communicate with networked console software on the console host 1 across a communication network and can communicate with the rest of the console supporting software 6 via inter-process communication mechanism.

The system unit 3 could be any computing system on the network such as a server, a desktop PC, a laptop PC, a hand held PDA, a cell phone, and any operational system. The server could be a video server, a web server, a storage block data server (SAN unit), a video monitoring device, and so forth without limits. The system unit 3 contains service software modules 8 that are capable of communicating with the outside world. For example, the service modules 8 is used to communicate with the control management software 4 of the control system 2 for carrying out the tasks distributed from the control system 2, or to communicate with the clients 10 of the CCDSVM for delivering services to them, or to communicate with another system unit 3 for transferring the data. The service software modules 8 could be implemented with any suitable programming languages such as C, C++, Java, or others. It should be noted that the communication protocol could be any suitable protocol such as IP (Internet Protocol) base or other non-IP based protocol.

The net1 11 represents any kind of communication links between the control system 2 and the web-console 9 or the client hosts 10. The net1 11 could be an infrastructure of internet, intranet, LAN or others that comprises connection media such as cables of Ethernet, optical Fiber, and/or other, wireless media, bus, and includes communication equipment such as switches, routers, and/or adapters.

The net2 12 also represents a communication infrastructure comprising communication media and equipment that are similar to the net1 11 has, except for providing communication between the control system 2 and the system units 3 or the web-consoles 9 across the infrastructure of internet, intranet, LAN, WAN, or other.

The client systems 10 are not part of the CCDSVM but they may requests services from the CCDSVM as shown in FIG. 2 via web browser.

FIG. 3 illustrates a simplified data flow between the web-console 9 on the console host 1 of FIG. 2 and the console supporting software 6 on the control system 2 of FIG. 2. Data travel from the web-console 9 to the console supporting software 6 includes two steps. First, the data goes from the web-console 9 to the web server software 7 of FIG. 2 via the net 11 or 12 of FIG. 2. Second, the console supporting software 6 gets the data from the web server software 7 of FIG. 2 via inter-process communication. To simplify the discussion of this invention, this data traveling path will simply refer to as the console supporting software 6 getting the data from the web-console 9 or refer to as the data being sent from the web-console 9 to the console supporting software 6.

Data traveling from the console supporting software 6 to the web-console 9 includes two reverse steps. First, the web server software 7 gets the data from the console supporting software 6 via inter-process communication. Second, the web server software 7 sends data to the web-console 9 via the net 11 or 12. To simplify the rest of discussion, this reverse data traveling will refer to as data being sent from the console supporting software 6 to the web-console 9 or refer to as the web-console 9 gets data from the console supporting software 6. In addition, the terms of data, information, and information on a web page will be used interchangeably herein.

Figure 4:
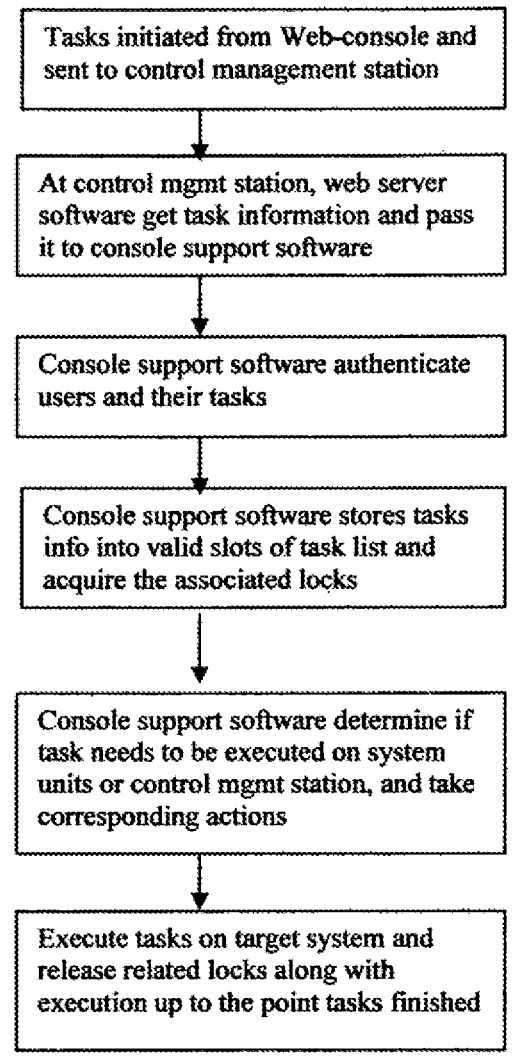
FIG. 4 illustrates an example of operation processing flow for a task in the CCDSVM environment.

FIG. 4 shows the basic tasks and operation processing flow chart, which initiated from the web-console 9.

FIG. 5 shows one embodiment of a user space task list. Each slot on the user space task list can be used to one task information relating to a task issued from the web-console 9. The stored task information in the slot will be cleared upon the task execution is finished.

Figure 6:
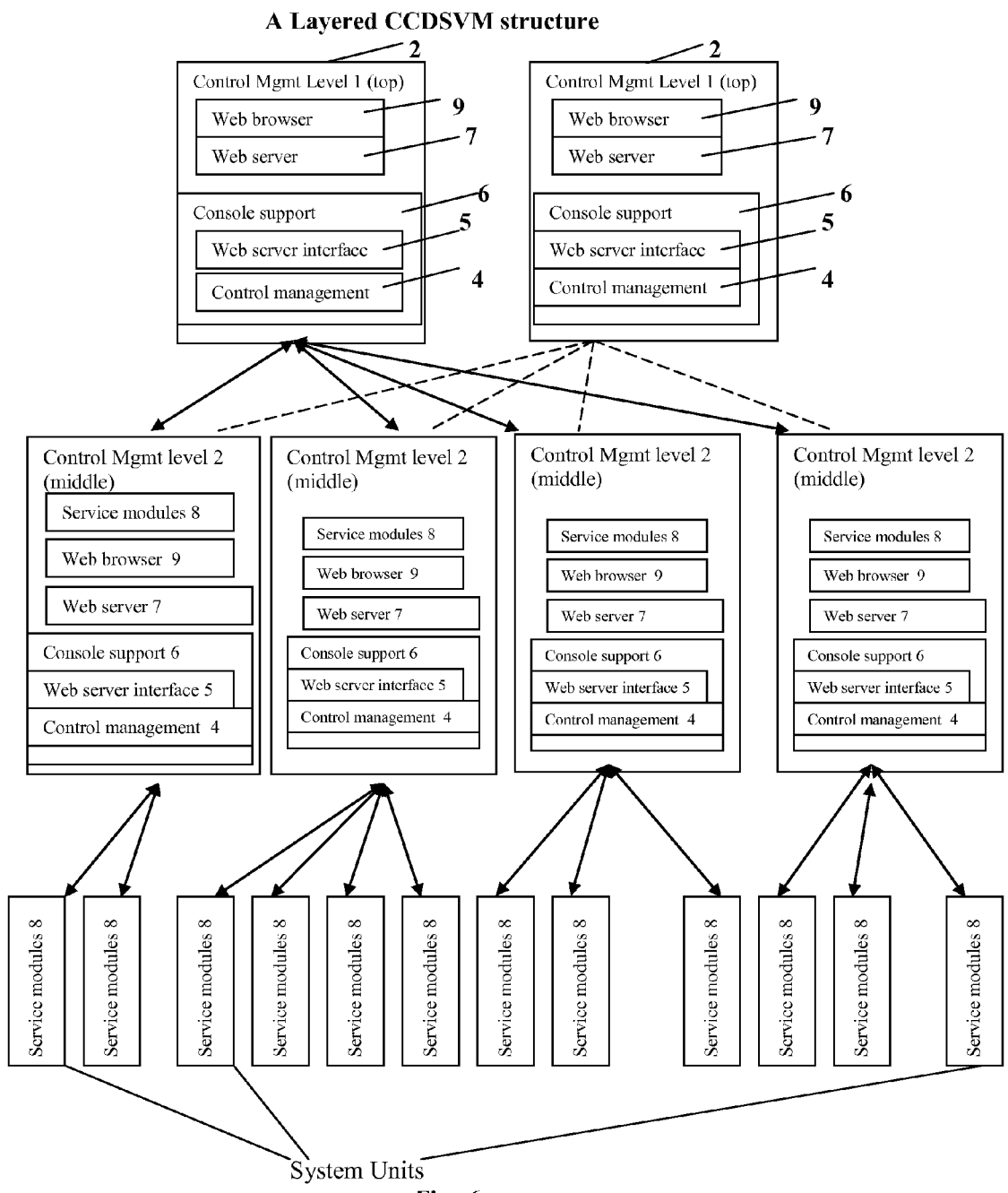
FIG. 6 illustrates a layered CCDSVM structure.

FIG. 6 illustrates another embodiment of a layered CCDSVM environment, which provides a flexible scalability mechanism to efficiently support thousands of heterogeneous system units 3. With this structure, a control system 2 at middle layer 2 becomes a system unit 3 and is controlled by a control system 2 at up layer 1.

Figure 7:
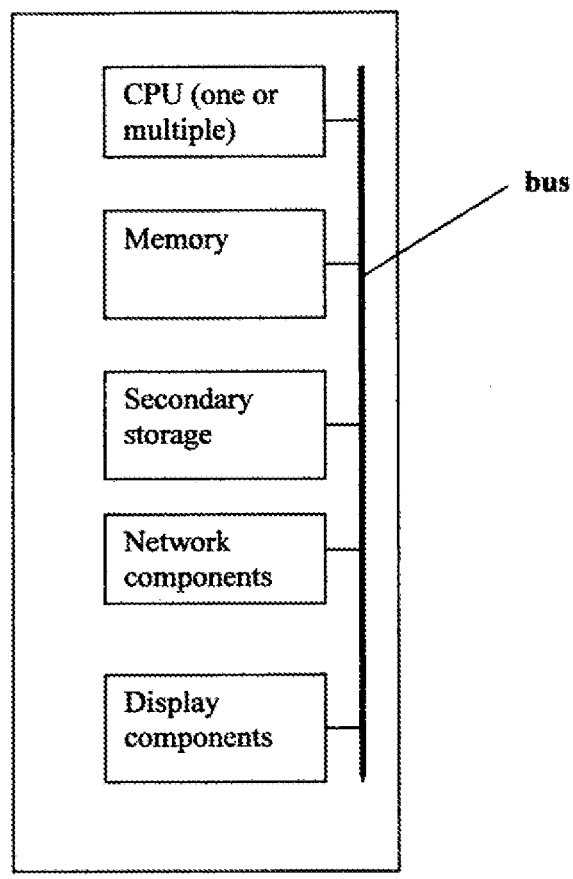
FIG. 7 illustrates typical hardware components for a computing device such as for a control management system, system units, and console system of present invention, where each computing device consists one or more CPU, memory, secondary storage such as disks or memory sticks, the network interface cards, and display components such as monitor or others. These components are connected through buses.

FIG. 7 illustrates a embodiment of typical hardware components for a computing system such as for the control management system 2, system units 3, and console hosts 1. The typical hardware consists of one or more CPU, memory, secondary storage such as disk drives and/or memory sticks, the network interface cards, and display components such as monitor or others. These components are connected internally through buses.

The detailed explanation of FIG. 2 will demonstrate how multiple concurrent tasks can be initiated from a web-console 9 and can be executed either on any one of the system units 3 or on the control system 2 according to this invention.

In one example, a user A at a web-console 9 receives an authentication from the console supporting software 6. In one embodiment, a successfully login on the control system 2 is considered an authentication because it authorizes the user A to access the CCDSVM. Thereafter, the user A can obtain all necessary information about the system units 3 and the control system 2 received from the console supporting software 6. When the user A initiates a task for a selected target computing system, which is either a system unit 3 or the control system 2, the task information is transmitted via the net 11 or 12 from the web-console 9 to the console support software 6 on the control system 2.

A thread is created based on the console support software, 6 where the thread will serve and carry out this task in background. The created thread acquires a lock and stores the task information into a valid entry of a user space task list shown in FIG. 5. This is one of efforts to ensure that the multiple tasks can be initiated simultaneously and concurrently within the same web-console 9 of FIG. 2 without delaying, effecting or blocking each other in the web-console 9 and free from racing each other.

In addition, multiple web-consoles 9 for multiple concurrent users anywhere on the net 11 or 12 also can be supported. The obtained locks for this task will be properly released one at a time along with the task execution up to a point when the task is finally finished. Therefore, each task could be executed without time delay. Also, the stored task information will be removed upon the execution of the task is finished.

If total tasks initiated from the web-console 9 have succeeded the maximum tasks allowed by the console supporting software 6, the initiated task is failed. The locks will be released by the corresponding thread and the user A on the web-console 9 will be notified correspondingly via net.

If an existing task is in a stage of changing a resource object on a target system and if a newly created task will make change on the same resource object on that target system, the newly initiated task may fail or may have to wait until the previous task is finished. Further, if a task is failed, the locks associated with the task will be release by the thread and the user A on the web-console 9 will be notified across the network of 11 or 12 by the console support software 6.

The credential of executing a specific task on a specific target computing system submitted by the user A is checked, where an ordinary users' access & operation permissions and credentials are setup by administrator with supervisor or special privileges. If the user A is not permitted to perform any task on such target computing system or is not permitted to perform such task on any one of the computing systems in the CCDSVM, the task execution will fail and the user A will be notified. Otherwise, the task will be carried out by the corresponding thread on the target computing system that is either a control system 2 or a system unit 3. If there is a need, the console supporting software 6 will send the results or data back to the web-console 9. When the task is failed nor succeeded, the threads of the console supporting software 6 will release the locks acquired for this task.

If the task needs to be executed on the control system 2, the thread created based on the console supporting software 6 will carry out this task. The threads of the console support software 6 also need to determine if they need to create another thread to execute this task. If there is a need, another thread will be created to execute this task. Once the task is finished, the corresponding locks will be released by the console supporting software 6.

If a task needs to be executed on a system unit 3, the console supporting software 6 will transmit the task information via the net2 12 to the service software module 8 of the target system unit 3. The thread based on the service software module 8 of the target system unit 3 will carry out this task. The service software module 8 on the target system unit 3 needs to determine if an additional thread needs to be created in order to execute such task. If there is a need, an additional thread is created to execute this task. Once the task is finished on the target system unit 3, the corresponding status of the task execution is transmitted back to the console supporting software 6 of the control system 2. Upon receiving the task finished status, the locks associated with the thread of the console support software 6 for that task are released.

The Task Issued From Web-Console

The multiple concurrent tasks issued from a web-console 9 by a user could be any of the followings:

a) Move or transmit data such as a multiple gigabytes of file or other data in any form from any point or any computing system to another point or another computing system within the CCDSVM.

b) Configure, partition and assign entire storage system (raid/disk) within the CCDSVM.

c) Setup authentication for a specific user from a web-console on a specific console host with certain privilege for the entire CCDSVM or for a specific computing system, which could be any one of the system units 3 or a control system 2. Setting up the steps of authentication process for any specific services on one or more specific system units 3.

d) Monitor and display activities and status for networks, storages, CPUs, processes and threads in the CCDSVM.

e) Create file system, file and directory structures, and support all other related data file operations on either the control management system 2 or the system units 3.

f) And all other type of tasks and operations that might be run in other operating system (OS) environment.

The capability of providing user with the multiple concurrent simultaneous operations and tasks on the web console 9 has indicated that this invention has created a web-based user work environment on top of an existing operating system of a single computing system or multiple computing systems. Further, this is a consistent working environment for a computing system since it allows a user to access exact the same working environment through the web-console 9, which could be a web browser located either on the computing system or located on other remote systems.

User Login

The user-login mechanism is also supported by the console supporting software 6. The web-console 9 obtains a login web page from the console supporting software 6 via the network of 11 & 12. Once the user provides an account name and a password via the login page displayed in the web-console 9, the authentication information is sent to the console supporting software 6 for validation. Upon successful validating the user account and password information, the console support software 6 sends all necessary information such as IP address to the web-console 9, where the information also includes the information of the control system 2 and system units 3.

The Maximum Tasks

The maximum multiple concurrent simultaneous tasks that can be initiated from the web-consoles 9 are determined by the console support software modules 6, and they are also determined based on the needs and the capacity of the control system 2.

The Credential Checking

The credential of a user includes the permission to access all or partial computing systems or a single computing system within the CCDSVM. The credential further includes the permission to run all tasks or partial tasks that are listed in the previous section of "The Task Issued From Web-Console". It also includes the permission of accessing a specific size of storage volumes. For example, a user B may be granted a permission to run tasks on computing systems X, Y, and Z. Another user C may be granted a permission to run tasks on the entire computing systems in the CCDSVM environment. The user C might be allowed to get system status on the computing systems X, Y, and Z only while the user B may be allowed to run all tasks on the computing systems X, Y, and Z. Each computing system mentioned here could be a control system 2 or any of system units 3. This basically represents a two-level authentication policy and checking. The first level is the security imposed on the control system 2 and the second level is the security imposed on the system units (3 of FIG. 2).

The Web-Server Interface Software Modules

The web-server interfacing software module 5 is responsible to get information from or send information to the web server software 7. It also interacts with the control management modules 4 via inter-process communication and communicates with service module 8 of the system unit 3 via the net2 12.

The Control Management Software Modules

The control management modules 4 on the control system 2 are responsible for communicating with the system units 3 for sending data to or receiving data from the system units via the net2 12. It also provides information of the system units 3 to the web interface software modules 5 of the control system 2 via an inter-process communication mechanism.

The Layered CCDSVM Structure

To be more efficiently support multiple concurrent tasks over a larger number of the system units 3, the CCDSVM can be organized into a multi-layered structure as illustrated in FIG. 6. With this layered structure, the CCDSVM can be sub-divided into different groups. For example, each one of level-2 control systems could function both as the control system 2 for controlling the system units 3 below it and could function as a system unit 3 that is controlled by the level-1 control system 2. Therefore, the level-2 control management station must be configured with all related software modules for both the control management station 2 and the system unit 3.

What is claimed is:

1. A wireless device for access remote storage, the wireless device comprising:
    at least one hardware processor, and a memory device comprising program code that, being executed by the at least one hardware processor, causes the wireless device to:
    establish a wireless link for access to a remote storage space controlled by a remote server, the remote storage space being allocated to a user of the wireless device for exclusive access;
    display information of the remote storage space on the wireless device upon receiving the information from the remote server; and
    process a first task for access to the remote storage space in response to the user from the wireless device through the information displayed performed the first task for said access,
        wherein the processing of the first task comprises:
            storing information of the first task and invoking a lock protection to protect the storing of the information;
            processing, according to the stored information, the first task in the background and causing the displaying of the information of the remote storage space on the wireless device without being blocked to allow the user through the information displayed performing a second task for access to the remote storage space without waiting for completion of the first task; and
            removing the stored information of the first task in respect to the completion of the first task.

2. The wireless device as recited in claim 1, wherein said program code causing the wireless device coupling with the remote server to process a first task further comprises:
    sending the first task to the remote server for further processing after processing the first task into the background.

3. The wireless device as recited in claim 2, further comprising: the remote server sending a response comprising status or result of the processing of the first task back to the wireless device and causing display of the response on the wireless device.

4. The wireless device as recited in claim 1, wherein said access to the remote storage space comprises:
    from the wireless device to store a file into the storage space or retrieve a file from the remote storage space.

5. The wireless device as recited in claim 1, wherein said access to the remote storage space comprises:
    creating, from the wireless device, a file or a folder (directory) in the remote storage space.

6. The wireless device as recited in claim 1, wherein said access to the remote storage space comprises:
    access, from the wireless device, to a video residing in the remote storage space.

7. The wireless device as recited in claim 1, wherein said wireless device displaying of information about the remote storage space further comprises:
    displaying information of a folder (directory) structure received from the remote server.

8. The wireless device as recited in claim 1, wherein the wireless device is one of a cell phone or a personal data assistant and management device ("PDA").

9. The wireless device as recited in claim 1, wherein the wireless device process the second task in the same way as to process the first task.

10. A system for access storage spaces, comprising:
    a server configured to control the storage spaces;
    a plurality of wireless devices, each of which being exclusively allocated by the server with one of the storage spaces for exclusive remote access, and
    wherein the each of the wireless devices is configured to:
        establish a wireless link for the each of the wireless devices remotely access to the one of the storage spaces;
        display information of the one of the storage spaces upon receiving the information from the server; and
        process a first task for access to the one of the storage spaces in response to a user of the each of the wireless devices through the information displayed performed the first task for said access,
            wherein the processing of the first task comprises:
                storing information of the first task and invoking a lock protection to protect the storing of the information;
                processing, according to the stored information, the first task in the background and causing the displaying of the information of the one of the storage spaces on the each of the wireless devices without being blocked to allow the user through the information displayed performing a second task for access to the one of the storage spaces without waiting for completion of the first task; and
                removing the stored information of the first task in respect to the completion of the first task.

11. The system as recited in claim 10, wherein the each of the wireless devices coupling with the server to process the first task further comprises: the each of the wireless devices sending the first task to the remote server for further processing after processing the first task into the background.

12. The system as recited in claim 11, further comprising: the remote server sending a response comprising status or result of the processing of the first task back to the each of the wireless devices and causing display of the response on the each of the wireless devices.

13. The system as recited in claim 11, wherein each of the wireless devices is one of a cell phone or a personal data assistant and management device ("PDA").

14. The system as recited in claim 10, wherein said access to the one of the storage spaces further comprises storing a file therein or retrieving a file therefrom, or creating a file or folder therein, or access to a video therefrom.

15. The system as recited in claim 10, wherein the wireless device processes the second task in the same way as to process the first task.

16. A non-transitory computer-readable medium configured in a wireless device and comprising program code which, being executed by the wireless device, causes the wireless device to:
    establish a wireless link for access to a remote storage space controlled by a remote server, the remote storage space being assigned to a user of the wireless device for exclusive access;
    display information of the remote storage space on the wireless device upon receiving the information from the remote server; and
    process a first task for access to the remote storage space in response to the user from the wireless device through the information displayed performed the first task for said access, wherein the processing of the first task comprises:
  storing information of the first task and invoking a lock protection to protect the storing of the information;
  processing, according to the information stored, the first task in the background and causing the displaying of the information of the remote storage space on the wireless device without being blocked to allow the user through the information displayed performing a second task for access to the remote storage space without waiting for completion of the first task; and
  removing the stored information of the first task in respect to the completion of the first task.

17. The computer-readable storage device of claim 16, wherein said program code causing the wireless device coupling with the remote server to process a first task further comprises: sending the first task to the remote server for further processing after processing the first task into the background.

18. The computer-readable storage device of claim 17, further comprising: the remote server sending a response comprising status or result of the processing of the first task back to the wireless device and causing display of the response on the wireless device.

19. The computer-readable storage device of claim 16, wherein the wireless device is one of a cell phone or a personal data assistant and management device ("PDA").

20. The computer-readable storage device of claim 16, wherein said access to the one of the storage spaces further comprises storing a file therein or retrieving a file therefrom, or creating a file or folder therein, or access to a video therefrom.

\* \* \* \* \*

UNITED STATES PATENT AND TRADEMARK OFFICE
CERTIFICATE OF CORRECTION

| | | |
|---|---|---|
| PATENT NO. | : 9,201,961 B2 | Page 1 of 1 |
| APPLICATION NO. | : 13/625121 | |
| DATED | : December 1, 2015 | |
| INVENTOR(S) | : Sheng Tai Ted Tsao | |

It is certified that error appears in the above-identified patent and that said Letters Patent is hereby corrected as shown below:

In the Specification
1) In col. 4, line 19, please replace "in" with ----those in----;
2) In col. 4, line 22, please replace "these" with ----the----;

In the Claims
3) In col. 9, line 21, and
   col. 10, line 17, and
   col. 10, line 66, please replace "performed" with ----performing----;
4) In col. 9, line 61, please replace "about" with ----of----.

Signed and Sealed this
Sixteenth Day of February, 2016

Michelle K. Lee
*Director of the United States Patent and Trademark Office*